United States Patent
Yang

(10) Patent No.: US 11,166,264 B2
(45) Date of Patent: Nov. 2, 2021

(54) MULTIPLEXING OF SHORT PHYSICAL DOWNLINK CONTROL CHANNEL AND DATA IN MOBILE COMMUNICATIONS

(71) Applicant: MediaTek Inc., Hsinchu (TW)

(72) Inventor: Weidong Yang, San Diego, CA (US)

(73) Assignee: MediaTek Inc.

( * ) Notice: Subject to any disclaimer, the term of this patent is extended or adjusted under 35 U.S.C. 154(b) by 0 days.

(21) Appl. No.: 15/889,401

(22) Filed: Feb. 6, 2018

(65) Prior Publication Data

US 2018/0227889 A1 Aug. 9, 2018

Related U.S. Application Data

(60) Provisional application No. 62/455,529, filed on Feb. 6, 2017, provisional application No. 62/476,680, filed on Mar. 24, 2017.

(51) Int. Cl.
*H04W 72/04* (2009.01)
*H04L 5/00* (2006.01)
*H04W 88/08* (2009.01)

(52) U.S. Cl.
CPC ......... *H04W 72/042* (2013.01); *H04L 5/0044* (2013.01); *H04L 5/0091* (2013.01)

(58) Field of Classification Search
CPC .......... H04W 72/042; H04W 72/0446; H04W 72/0406; H04W 88/08; H04W 84/042; H04W 28/08; H04W 72/12; H04W 74/0833; H04W 72/1263; H04L 1/1893; H04L 5/0051; H04L 5/0048; H04L 5/0044; H04L 5/0007; H04L 5/0094; H04L 5/0091; H04L 5/001; H04L 5/0023; H04L 5/0053; H04L 5/0092
(Continued)

(56) References Cited

U.S. PATENT DOCUMENTS 9,668,255 B2 * 5/2017 Zhang ................... H04W 24/10
2013/0223402 A1 * 8/2013 Feng ..................... H04L 5/0007
370/330
(Continued)

FOREIGN PATENT DOCUMENTS

WO  WO 2013/166938 A1  11/2013
WO  WO 2017018761 A1   2/2017

OTHER PUBLICATIONS

State Intellectual Property Office, International Search Report and Written Opinion regarding International Patent Application No. PCT/CN2018/075434, dated Apr. 24, 2018.
(Continued)

*Primary Examiner* — Edan Orgad
*Assistant Examiner* — Vanneilian Lalchinthang
(74) *Attorney, Agent, or Firm* — Han IP PLLC; Andy M. Han

(57) ABSTRACT

Various solutions for multiplexing of short physical downlink control channel and data with respect to user equipment and network apparatus in mobile communications are described. An apparatus may receive a reuse indication from a control channel. The apparatus may determine whether a plurality of control channel elements (CCEs) are reused for a data channel according to the reuse indication. The apparatus may further receive the data channel in the CCEs in an event that the reuse indication indicates that the CCEs are reused.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0294361 A1 | 11/2013 | Chen et al. | |
| 2015/0023270 A1* | 1/2015 | Park | H04L 27/2613 |
| | | | 370/329 |
| 2015/0282151 A1* | 10/2015 | Ezaki | H04L 5/0053 |
| | | | 370/329 |
| 2017/0142712 A1* | 5/2017 | Lee | H04W 72/0446 |
| 2017/0280429 A1* | 9/2017 | Shen | H04W 72/0406 |
| 2017/0289970 A1* | 10/2017 | Yang | H04W 52/146 |
| 2018/0049189 A1* | 2/2018 | Hugl | H04W 72/042 |
| 2018/0049197 A1* | 2/2018 | Patel | H04J 1/00 |
| 2018/0310280 A1* | 10/2018 | Byun | H04L 5/0053 |
| 2018/0343682 A1* | 11/2018 | Tang | H04L 1/0006 |
| 2019/0116592 A1* | 4/2019 | Moon | H04L 5/0092 |

OTHER PUBLICATIONS

Qualcomm Incorporated, NB-PDSCH design, 3GPP TSG RAN WG1 Meeting #84 R1-160877, Feb. 19, 2016.
Qualcomm Incorporated, Resource reuse for data in DL control region, 3GPP TSG RAN WG1 NR Ad-Hoc#2 R1-1711182, Jun. 30, 2017.
Zte et al., PDCCH procedure and DCI carried by PDSCH region, 3GPP TSG RAN WG1 Meeting #88 R1-1701588, Feb. 17, 2017.
Taiwan Intellectual Property Office, Office Action for Taiwan Patent Application No. 107104176, dated Mar. 15, 2019.
Qualcomm Incorporated, NB-PDSCH design, 3GPP TSG RAN WG1 Meeting #84, St Julian's, Malta, Feb. 15-19, 2016.
European Patent Office, Extended European Search Report for European Patent Application No. 18747741.9, dated Feb. 14, 2020.

* cited by examiner

300

310

| RB SET 1 | RB SET 2 |
|---|---|
| B1 | B2 |

B1 FOR RB SET 1
B2 FOR RB SET 2

| RB SET 1 | B1 |
|---|---|

| RB SET 2 | B2 |
|---|---|

320

| RB SET 1 | RB SET 2 |
|---|---|
| B1B2 | N/A |

B1 FOR FIRST HALF CCEs OF RB SET 1
B2 FOR SECOND HALF CCEs OF RB SET 1

| RB SET 1 | B1 | B2 |
|---|---|---|

330

| RB SET 1 | RB SET 2 |
|---|---|
| N/A | B1B2 |

B1 FOR FIRST HALF CCEs OF RB SET 2
B2 FOR SECOND HALF CCEs OF RB SET 2

| RB SET 2 | B1 | B2 |
|---|---|---|

FIG. 3

MULTIPLEXING OF SHORT PHYSICAL DOWNLINK CONTROL CHANNEL AND DATA IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/455,529 and 62/476,680, filed on 6 Feb. 2017 and 24 Mar. 2017, respectively, the contents of which are incorporated by reference in its entirety.

TECHNICAL FIELD

The present disclosure is generally related to mobile communications and, more particularly, to multiplexing of short physical downlink control channel and data with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR) communication network or a newly developed next generation communication network, a short transmission time interval (sTTI) may be introduced for more flexible scheduling of downlink control information and data information. There may be a plurality of sTTIs configured in one sub-frame. Each sTTI may comprise 2 or 3 orthogonal frequency-division multiplexing (OFDM) symbols. A short physical downlink control channel (sPDCCH) may also be introduced for carrying control channel information.

In Long-Term Evolution (LTE), the PDCCH is defined over the control region over all the physical resource blocks (PRBs) in a system bandwidth. In NR, the sPDCCH may be defined over a subset of the PRBs available in a system bandwidth. In LTE, the resource elements allocated for PDCCHs may not be used for data. If the allocated PDCCH resources are not used for control information, the unused PDCCH resources may be blank and wasted. However, in NR, the resource elements allocated for sPDCCHs may be reused for data. The resource elements may be used more efficient and more flexible.

Accordingly, it is important for the user equipment (UE) to know what sPDCCH resources are reused for data transmission. Therefore, in developing new communication systems, it is needed to properly design the multiplexing mechanisms for sPDCCH and data.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to multiplexing of short physical downlink control channel and data with respect to user equipment and network apparatus in mobile communications.

In one aspect, a method may involve an apparatus receiving a reuse indication from a control channel. The method may also involve the apparatus determining whether a plurality of control channel elements (CCEs) are reused for a data channel according to the reuse indication. The method may further involve the apparatus receiving the data channel in the CCEs in an event that the reuse indication indicates that the CCEs are reused.

In one aspect, an apparatus may comprise a transceiver capable of wirelessly communicating with a plurality of nodes of a wireless network. The apparatus may also comprise a processor communicatively coupled to the transceiver. The processor may be capable of receiving a reuse indication from a control channel. The processor may also be capable of determining whether a plurality of control channel elements (CCEs) are reused for a data channel according to the reuse indication. The processor may further be capable of receiving the data channel in the CCEs in an event that the reuse indication indicates that the CCEs are reused.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram depicting an example scenario under schemes in accordance with implementations of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multiplexing of short physical downlink control channel and data with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
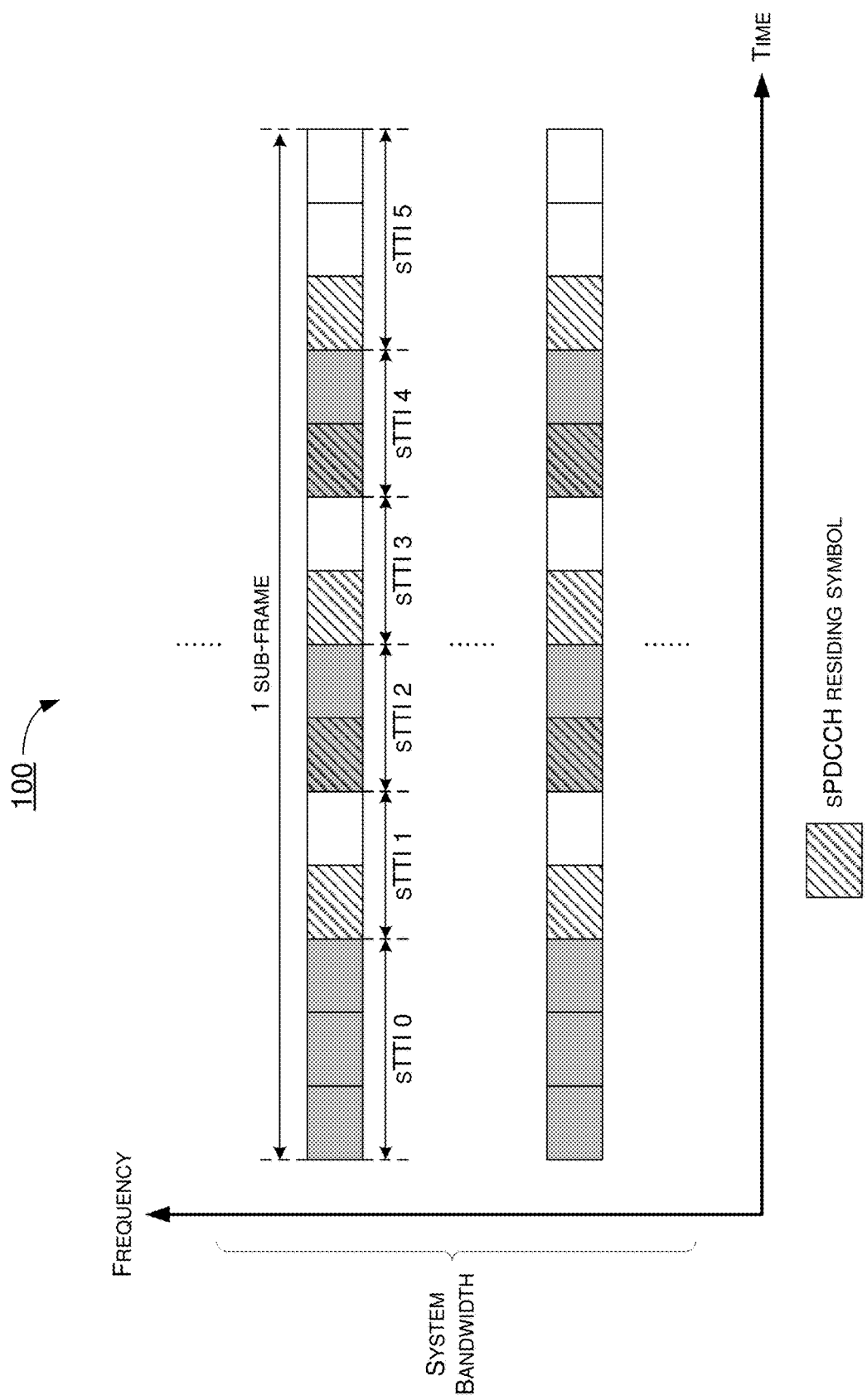
FIG. 1 is a diagram depicting an example sTTI pattern under schemes in accordance with implementations of the present disclosure.

In New Radio (NR), a short transmission time interval (sTTI) is introduced for more flexible scheduling of downlink control information and data information. FIG. 1 illustrates an example sTTI pattern 100 under schemes in accordance with implementations of the present disclosure. As showed in FIG. 1, there are 6 sTTIs configured in one sub-frame. Each sTTI may comprise 2 or 3 orthogonal frequency-division multiplexing (OFDM) symbols.

On the other hand, a short physical downlink control channel (sPDCCH) is introduced for carrying control channel information. The sPDCCHs may be defined over sPDCCH resources in the frequency domain and may be located on the first symbols of the sTTIs in the time domain. In Long-Term Evolution (LTE), the PDCCH is defined over the control region over all the physical resource blocks (PRBs) in a system bandwidth. In NR, the sPDCCH may be defined over a subset of the PRBs available in a system bandwidth. The subset of the PRBs may be non-continuous as illustrated in FIG. 1. The non-continuous sPDCCH resources may be concatenated in the logic domain to obtain contiguous logical resources in the frequency domain for facilitating the design of sPDCCH.

To define the resources for the sPDCCH, the resource element group (REG) and the control channel element (CCE) may be used. A REG may consist of 4 resource elements (REs). A CCE may consist of 9 REGs. Over one PRB, 2 or 3 REGs may be defined at the starting OFDM symbol in a sTTI depending on whether cell-specific reference signal (CRS) or demodulation reference signal (DMRS) is used for sPDCCH demodulation and whether CRS is present in the first symbol of a sTTI. A block interleaver may also be used for providing frequency diversity for sPDCCH. The control region of each sTTI may consist of a set of CCEs numbered from 0 to $N_{CCE,k}-1$. $N_{CCE,k}$ is the total number of CCEs in the control region of sTTI k.

The UE may be configured to monitor a set of sPDCCH candidates on one or more activated serving cells for control information. The serving cells may have to indicate the sPDCCH resources to the UE for UE's monitoring and decoding. There are various signaling methods for indicating the sPDCCH resources. For example, the sPDCCH resources may be dynamically indicated by the serving cells. The sPDCCH resources in a sub-frame may be dynamically indicated by a PDCCH at the same sub-frame. The PDCCH may be associated with a sTTI-radio network temporary identifier (RNTI) and the downlink control information (DCI) carried by the PDCCH may have the same size of DCI 1C or DCI 1A. Accordingly, the blink detection effort at the UE side may be alleviated. In this example, the indication may include the PRBs over which the search space for sPDCCH is defined. Additionally, some restrictions on the aggregation level of the sPDCCH may also be indicated for reducing blind detection complexity at the UE side.

Alternatively, the candidate locations of sPDCCH in frequency domain may be semi-statically configured for a UE. The PRBs over which the search space of sPDCCH may be defined. The candidate locations of sPDCCH in time domain may be implicitly derived from the sTTI lengths and physical control format indicator channel (PCFICH) since the sTTI lengths within a sub-frame depend on the PDCCH region size indicated by PCFICH.

Alternatively, the dynamical indication and the semi-statically indication may be combined. The candidate locations of sPDCCH may be semi-statically configured for a UE. Then, whether a UE needs to monitor the sPDCCH in a sub-frame may be dynamically determined. The main benefit of the semi-statically configuration is that the signaling overhead is less than the dynamical indication for sPDCCH resources. Accordingly, it is possible to configure multiple sets of sPDCCH resources at a UE and use dynamical signaling to select one set of sPDCCH resources for the current sub-frame.

Figure 2:
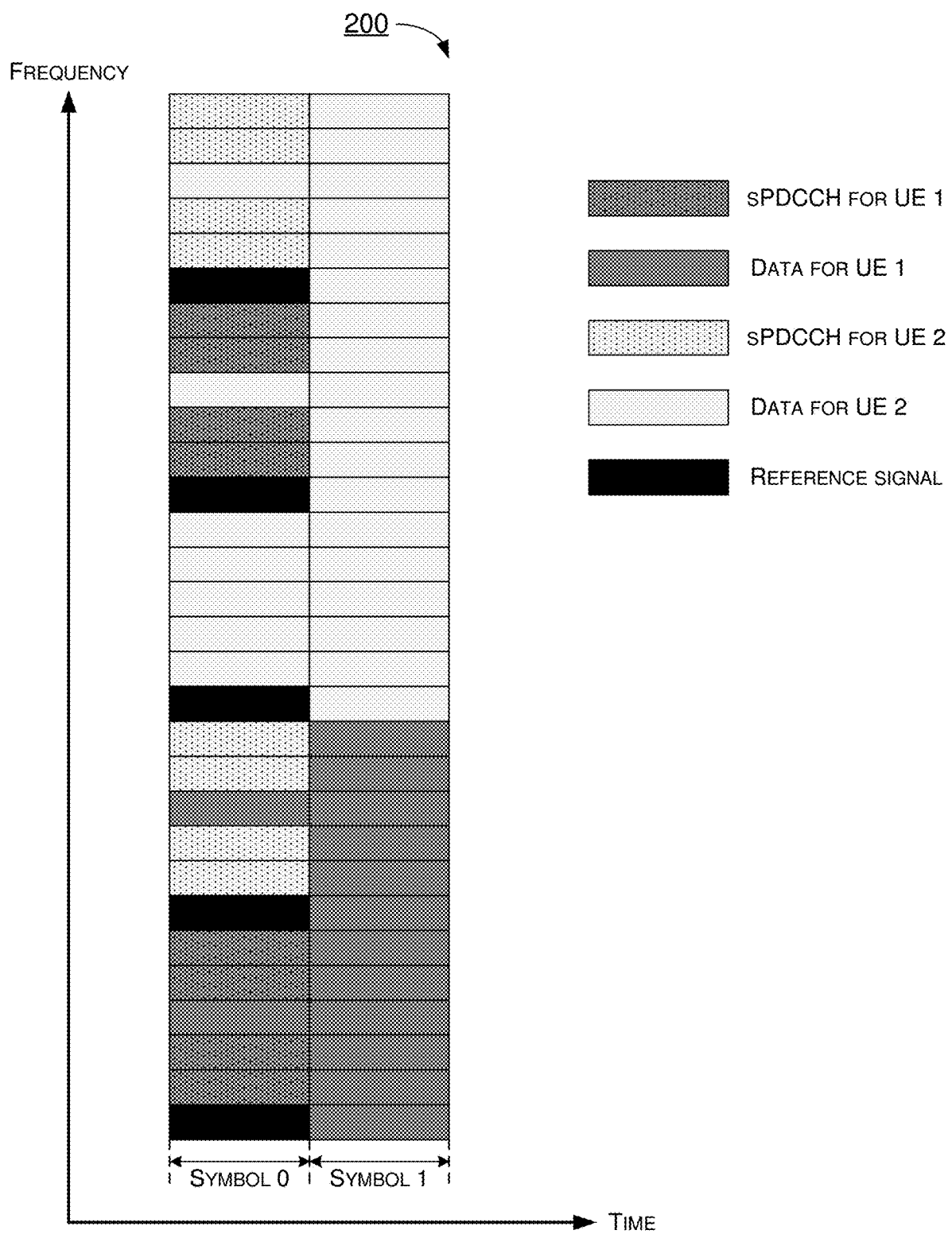
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a first UE (e.g., UE 1), a second UE (e.g., UE 2) and at least one network apparatus, which may be a part of a wireless communication network (e.g., a Long-Term Evolution (LTE) network, a LTE-Advanced network, a LTE-Advanced Pro network, a $5^{th}$ Generation (5G) network, a New Radio (NR) network). FIG. 2 provides a general view on multiplexing of sPDCCH and data. In LTE, the resource elements allocated for PDCCHs may not be used for data. If the allocated PDCCH resources are not used for control information, the unused PDCCH resources may be blank and wasted. However, in the schemes in accordance with implementations of the present disclosure, the resource elements allocated for sPDCCHs may be reused for data. As showed in FIG. 2, the resource elements at symbol 0 are allocated for sPDCCH. Some resource elements at symbol 0 may be scheduled with control information (e.g., sPDCCH for UE 1 or sPDCCH for UE 2). The other resource elements at symbol 0 not used by control information may be reused for data (e.g., data for UE 1 or data for UE 2). Accordingly, the resource elements may be used more efficient and more flexible.

Since the resource element may be reused for data or may multiplex sPDCCH and data, the serving cell may need to indicate the UE what resource elements are in use by sPDCCH or alternatively not in use by sPDCCH. The serving cell may be configured to include a field in the DCI of sPDCCH to indicate the usage of CCEs for sPDCCH in the current sTTI occasion. Depending on the sPDCCH resources, there may be resource elements not associated with any CCEs. These resource elements may be used for data (e.g., short physical downlink shared channel (sPDSCH)). For example, assuming that 20 PRBs are configured as sPDCCH resources. There are 4 CCEs (i.e., 2 (two REGs per PRB)*20 (number of PRBs)/9 (REGs in one CCE)=4.44) can be defined over the first symbol in a sTTI and there are 16 resource elements not used by any CCEs in that symbol. Accordingly, these 16 resource elements may be used for sPDSCH.

As there may be many CCEs in the sPDCCH resources (e.g., 100 PRBs for the sPDCCH resources), to indicate whether each of them is used to the UE may produce heavy signaling overhead. The serving cell may be further configured to indicate CCEs at a relatively high aggregation level (e.g., bitmap indication). In one example, there may be 22 CCEs over 100 PRBs and 5 CCEs over 25 PRBs. A 6 bits indication field may be used for indicating CCE usage. For example, for the sPDCCH resources defined over 100 PRBs, each bit of the 6 bits indication may be used for indicating 4 CCEs. A bitmap [110100] may indicate that CCEs 1-4, 5-8 and 13-16 are in use and CCEs 9-12, 17-20 and 21-22 are not in use. The UE may assume that the CCEs not in use and residing in the same PRB are used for sPDSCH transmission. For the sPDCCH defined over a smaller number of PRBs (e.g., 25 PRBs), a bitmap [110100] may indicate that CCEs 1, 2 and 3 are in use.

Accordingly, the UE may be able to determine the sPDCCH search space according to a semi-static indication, a dynamical indication or a combination thereof. The DCI carried in sPDCCH may comprise a CCE usage filed which may indicate what CCEs in the sPDCCH search space are in use or alternatively not in use. In a case that the CCE usage filed is a bitmap, each bit of the bitmap may represent the usage of X CCEs (e.g., X contiguous CCEs in the logic domain). X may be a function of a size of the sPDCCH resources counted as number of PRBs over which the sPDCCH space is defined. The larger the sPDCCH resources, the larger the X may be. The UE may be configured to search for sPDCCH. In an event that a sPDCCH containing DCI is found, the resource elements un-available for sPDSCH allocation on the symbols where sPDCCH resides may comprise the resource elements for reference signals, the CCEs used by the detected sPDCCH, the un-available CCEs determined from the CCE usage field in the DCI of the sPDCCH or the resource elements in the PRBs which are not included in the frequency domain allocation of sPDSCH. The UE may be configured to perform rate matching for sPDSCH on the unused resource elements.

FIG. 3 illustrates an example scenario 300 under schemes in accordance with implementations of the present disclosure. Scenario 300 involves a UE and a network apparatus, which may be a part of a wireless communication network (e.g., a LTE network, a LTE-Advanced network, a LTE-Advanced Pro network, a $5^{th}$ Generation (5G) network, a New Radio (NR) network). FIG. 3 illustrates another implementation of the CCE or short CCE (sCCE) usage field indication for sPDCCH and/or sPDSCH. The CCE usage field indication described above may also be called reuse indication in this implementation and may also be applied on sCCE usage field indication. The UE may be configured by higher layers with layer 1 (L1) based sPDCCH reuse indication. Generally, the UE may be configured to receive the reuse indication from the control channel (e.g., sPDCCH). The UE may determine whether a plurality of CCEs are reused for the data channel (e.g., sPDSCH) according to the reuse indication. Then, the UE may be configured to receive the data channel in the CCEs in an event that the reuse indication indicates that the CCEs are reused.

As showed in FIG. 3, there may be three L1 indication options 310, 320 and 330. In indication option 310, 1-bit indication for each RB set may be applicable in case of 2 sPDCCH RB sets are configured for monitoring. Specifically, the UE may be configured to receive the dynamical signaling with 2 bits in DCI. The 2 bits may be represented by b1b2 carried in DCI. The first bit b1 may be used to indicate a first RB set (e.g., RB set 1). The second bit b2 may be used to indicate a second RB set (e.g., RB set 2). Based on the L1 based sPDCCH reuse indication, the UE may be configured to determine the rate-matching behavior of sPDSCH scheduled around sPDCCH resources. The one bit for each of the two sPDCCH RB sets may indicate whether the UE needs to rate-match the allocated sPDSCH around the overlapping or reused resources with the respective sPDCCH RB set. For example, in a case that b1=1, the UE may determine that RB set 1 is reused for sPDSCH. The UE may receive downlink data in RB set 1. In a case that b2=0, the UE may determine that RB set 2 is configured for sPDCCH. The UE may monitor and decode sPDCCH in RB set 2.

In indication options 320, 2-bit indication for the first RB set may be applicable in case of 1 or 2 sPDCCH RB sets are configured for monitoring. Specifically, the UE may be configured to receive the dynamical signaling with 2 bits in DCI. The 2 bits may be represented by b1b2 carried in DCI. The first bit b1 may be used to indicate a first group of CCEs of the first RB set (e.g., RB set 1). The second bit b2 may be used to indicate a second group of CCES of the first RB set (e.g., RB set 1). Based on the L1 based sPDCCH reuse indication, the UE may be configured to determine the rate-matching behavior of sPDSCH scheduled around the corresponding CCEs. The first bit may indicate the rate-matching of sPDSCH around the overlap with CCE #0 to CCE #(floor($N_{CCE,k}/2$)−1) of the k-th sPDCCH RB set. The second bit may indicate the rate-matching of sPDSCH around the overlap with CCE #(floor($N_{CCE,k}/2$)) to CCE #$N_{CCE,k}$−1 of the k-th sPDCCH RB set. $N_{CCE,k}$ is the CCE numbers defined over k-th sPDCCH RB set. Accordingly, each of the first group of CCEs and the second group of CCEs is a function of a size of control channel resources defined in a RB set (e.g., $N_{CCE,k}$). A bit value of 1 may indicate that sPDSCH is rate-mated around the respective indicated sPDCCH resources (e.g., the indicated group of CCEs). The RB set may be defined over a plurality of PRBs and may be configured by the serving cell via RRC signaling. For example, in a case that b1=1, the UE may determine that the first half CCEs of RB set 1 are reused for sPDSCH. The UE may receive downlink data in the first half CCEs of RB set 1. In a case that b2=0, the UE may determine that the second half CCEs of RB set 1 is configured for sPDCCH. The UE may monitor and decode sPDCCH in the second half CCEs of RB set 1.

In indication options 330, 2-bit indication for the second RB set may be applicable in case of 2 sPDCCH RB sets are configured for monitoring. Specifically, the UE may be configured to receive the dynamical signaling with 2 bits in DCI. The 2 bits may be represented by b1b2 carried in DCI. The first bit b1 may be used to indicate a first group of CCEs of the second RB set (e.g., RB set 2). The second bit b2 may be used to indicate a second group of CCES of the second RB set (e.g., RB set 2). Similarly, the first bit may indicate the rate-matching of sPDSCH around the overlap with CCE #0 to CCE #(floor($N_{CCE,k}/2$)−1) of the k-th sPDCCH RB set. The second bit may indicate the rate-matching of sPDSCH around the overlap with CCE #(floor($N_{CCE,k}/2$)) to CCE #$N_{CCE,k}$−1 of the k-th sPDCCH RB set. $N_{CCE,k}$ is the CCE numbers defined over k-th sPDCCH RB set. Accordingly, each of the first group of CCEs and the second group of CCEs is a function of a size of control channel resources defined in a RB set (e.g., $N_{CCE,k}$). A bit value of 1 may indicate that sPDSCH is rate-mated around the respective indicated sPDCCH resources (e.g., the indicated group of CCEs). The RB set may be defined over a plurality of PRBs and may be configured by the serving cell via RRC signaling. For example, in a case that b1=1, the UE may determine that the first half CCEs of RB set 2 are reused for sPDSCH. The UE may receive downlink data in the first half CCEs of RB set 2. In a case that b2=0, the UE may determine that the second half CCEs of RB set 2 is configured for sPDCCH. The UE may monitor and decode sPDCCH in the second half CCEs of RB set 2.

Indication options 310, 320 and 330 may be configured by higher layer signaling (e.g., radio resource control (RRC) signaling) from the serving cell. The serving cell may include an indication for indicating the reuse indication configuration in a RRC message. The UE may be configured to apply the reuse indication configuration according to the RRC message. For example, a configuration denoted as state {1, 1} may be used for indicating the UE to apply the 1-bit indication for each of 2 configured RB sets. A configuration denoted as state {2, 0} may be used for indicating the UE to apply the 2-bit indication for the first RB set of 1 or 2 configured RB sets. A configuration denoted as state {0, 2} may be used for indicating the UE to apply the 2-bit indication for the second RB set of 2 configured RB sets.

For state {2, 0} or state {0, 2}, the L1 indication only applies to one of the 2 configured RB sets. For the RB set associated with state "0", the RRC configured rate-matching modes may be applied for the CCEs of the RB set without L1 indication. The UE may be further configured to operate in one of the following four modes of sPDCCH rate-matching operation. In a Mode 1, the UE may be configured to rate-match only around the sDCI scheduling the sPDSCH (if transmitted in the sPDCCH RB-set). Otherwise, no rate-matching is performed for the RB set. In a Mode 2, the UE may be configured to rate-match around the whole sPDCCH RB set. In a Mode 3, the UE may be configured to rate-match around the whole sPDCCH RB set if sDCI scheduling the sPDSCH is found in the RB-set. Otherwise, no rate-matching is performed for the RB set. In a Mode 4, the UE may be configured to rate-match around the whole sPDCCH RB set if sDCI scheduling the sPDSCH is not found in the RB-set. Otherwise, the UE may rate-match only around the sDCI scheduling the sPDSCH (if transmitted in the sPDCCH RB-set).

Illustrative Implementations

Figure 4:
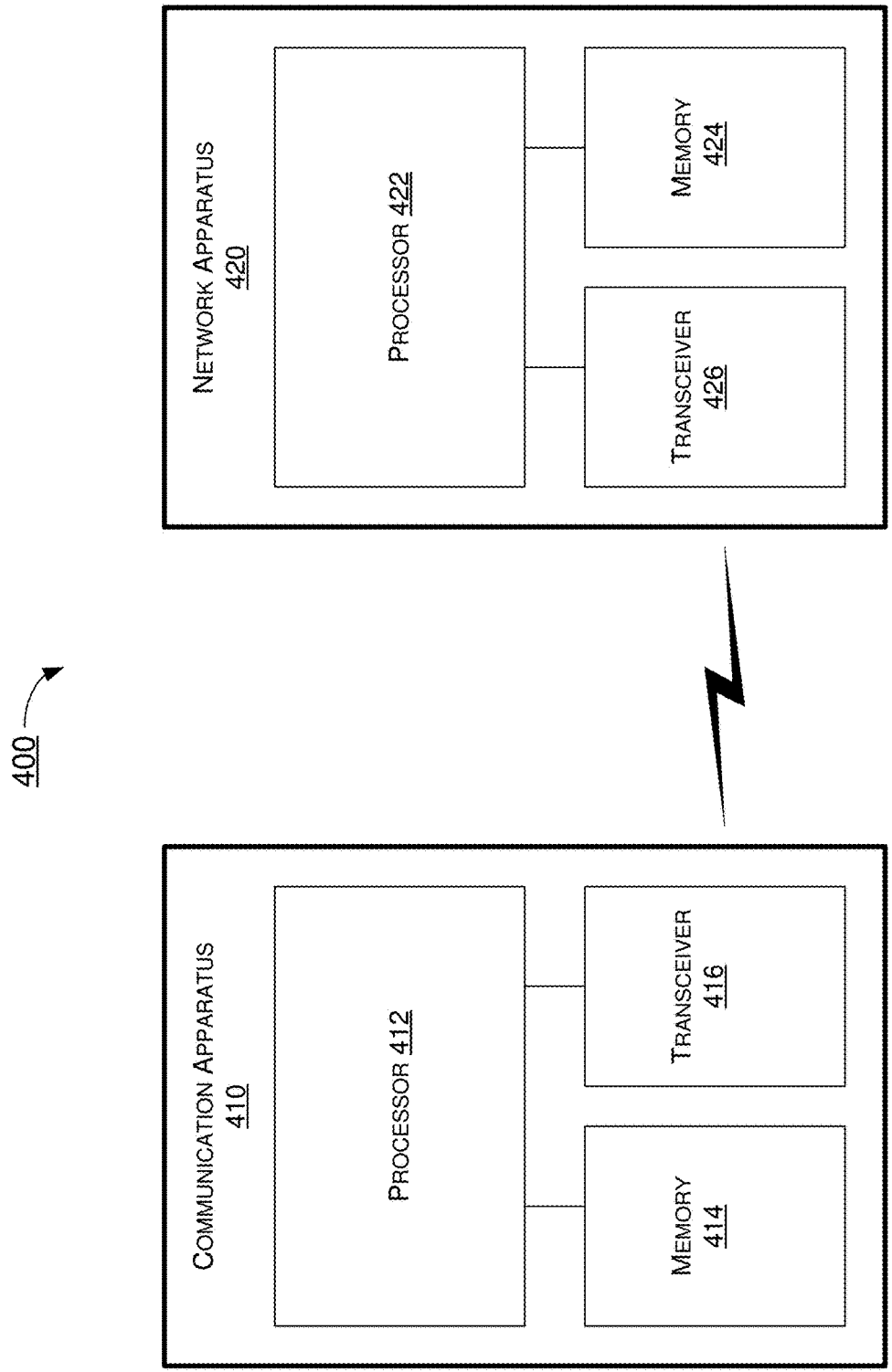
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to multiplexing of sPDCCH and data with respect to user equipment and network apparatus in wireless communications, including scenarios 100, 200 and 300 described above as well as process 500 described below.

Communication apparatus 410 may be a part of an electronic apparatus, which may be a user equipment (UE) such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in a LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may be configured to monitor, via transceiver 416, a set of sPDCCH candidates from network apparatus 420 for control information. Processor 422 may be configured to indicate, via transceiver 426, the sPDCCH resources to communication apparatus 410 for its monitoring and decoding. There are various signaling methods for indicating the sPDCCH resources. For example, the sPDCCH resources may be dynamically indicated by processor 422. The sPDCCH resources in a sub-frame may be dynamically indicated by a PDCCH at the same sub-frame. The PDCCH may be associated with a sTTI-RNTI and the DCI carried by the PDCCH may have the same size of DCI 1C or DCI 1A. Accordingly, the blink detection effort at processor 412 may be alleviated. In this example, the indication may include the PRBs over which the search space for sPDCCH is defined. Additionally, some restrictions on the aggregation level of the sPDCCH may also be indicated for reducing blind detection complexity at processor 412.

In some implementations, the candidate locations of sPDCCH in frequency domain may be semi-statically configured for communication apparatus 410. The PRBs over which the search space of sPDCCH may be defined. The candidate locations of sPDCCH in time domain may be implicitly derived from the sTTI lengths and PCFICH since the sTTI lengths within a sub-frame depend on the PDCCH region size indicated by PCFICH.

In some implementations, the dynamical indication and the semi-statically indication may be combined. The candidate locations of sPDCCH may be semi-statically configured for communication apparatus 410. Then, whether processor 412 needs to monitor the sPDCCH in a sub-frame may be dynamically determined. The main benefit of the semi-statically configuration is that the signaling overhead is less than the dynamical indication for sPDCCH resources. Accordingly, it is possible to configure multiple sets of sPDCCH resources at communication apparatus 410 and use dynamical signaling to select one set of sPDCCH resources for the current sub-frame.

In some implementations, since the resource element may be reused for data or may multiplex sPDCCH and data, processor 422 may need to indicate communication apparatus 410 what resource elements are in use by sPDCCH or alternatively not in use by sPDCCH. Processor 422 may be configured to include a field in the DCI of sPDCCH to indicate the usage of CCEs for sPDCCH in the current sTTI occasion. Depending on the sPDCCH resources, there may be resource elements not associated with any CCEs. These resource elements may be used for data (e.g., short physical downlink shared channel (sPDSCH)).

In some implementations, as there may be many CCEs in the sPDCCH resources (e.g., 100 PRBs for the sPDCCH resources), to indicate whether each of them is used to communication apparatus 410 may produce heavy signaling overhead. Processor 422 may be further configured to indicate CCEs at a relatively high aggregation level (e.g., bitmap indication). In one example, there may be 22 CCEs over 100 PRBs and 5 CCEs over 25 PRBs. A 6 bits indication field may be used for indicating CCE usage. For example, for the sPDCCH resources defined over 100 PRBs, each bit of the 6 bits indication may be used for indicating 4 CCEs. Processor 422 may use the bitmap [110100] to indicate that CCEs 1-4, 5-8 and 13-16 are in use and CCEs 9-12, 17-20 and 21-22 are not in use. Processor 412 may assume that the CCEs not in use and residing in the same PRB are used for sPDSCH transmission. For the sPDCCH defined over a smaller number of PRBs (e.g., 25 PRBs), processor 422 may use the bitmap [110100] to indicate that CCEs 1, 2 and 3 are in use.

In some implementations, processor 412 may be able to determine the sPDCCH search space according to a semi-static indication, a dynamical indication or a combination thereof. The DCI carried in sPDCCH may comprise a CCE usage filed which may indicate what CCEs in the sPDCCH search space are in use or alternatively not in use. In a case that the CCE usage filed is a bitmap, each bit of the bitmap may represent the usage of X CCEs (e.g., X contiguous CCEs in the logic domain). Processor 412 may be configured to search for sPDCCH. In an event that a sPDCCH containing DCI is found, the resource elements un-available for sPDSCH allocation on the symbols where sPDCCH resides may comprise the resource elements for reference signals, the CCEs used by the detected sPDCCH, the un-available CCEs determined from the CCE usage field in the DCI of the sPDCCH or the resource elements in the PRBs which are not included in the frequency domain allocation of sPDSCH. Processor 412 may be configured to perform rate matching for sPDSCH on the unused resource elements.

In some implementations, processor 412 may be configured by higher layers with layer 1 (L1) based sPDCCH reuse indication. Generally, processor 412 may be configured to receive, via transceiver 416, the reuse indication from the control channel (e.g., sPDCCH). Processor 412 may determine whether a plurality of CCEs are reused for the data channel (e.g., sPDSCH) according to the reuse indication. Then, processor 412 may be configured to receive, via transceiver 416, the data channel in the CCEs in an event that the reuse indication indicates that the CCEs are reused.

In some implementations, 1-bit indication for each RB set may be applicable in case of 2 sPDCCH RB sets are configured for monitoring. Specifically, processor 412 may be configured to receive the dynamical signaling with 2 bits in DCI. The 2 bits may be represented by b1b2 carried in DCI. The first bit b1 may be used to indicate a first RB set. The second bit b2 may be used to indicate a second RB set. Based on the L1 based sPDCCH reuse indication, processor 412 may be configured to determine the rate-matching behavior of sPDSCH scheduled around sPDCCH resources. The one bit for each of the two sPDCCH RB sets may indicate whether communication apparatus 410 needs to rate-match the allocated sPDSCH around the overlapping or reused resources with the respective sPDCCH RB set. For example, in a case that b1=1, processor 412 may determine that RB set 1 is reused for sPDSCH. Processor 412 may receive downlink data in RB set 1. In a case that b2=0, processor 412 may determine that RB set 2 is configured for sPDCCH. Processor 412 may monitor and decode sPDCCH in RB set 2.

In some implementations, 2-bit indication for the first RB set may be applicable in case of 1 or 2 sPDCCH RB sets are configured for monitoring. Specifically, processor 412 may be configured to receive the dynamical signaling with 2 bits in DCI. The 2 bits may be represented by b1b2 carried in DCI. The first bit b1 may be used to indicate a first group of CCEs of the first RB set. The second bit b2 may be used to indicate a second group of CCES of the first RB set. Based on the L1 based sPDCCH reuse indication, processor 412 may be configured to determine the rate-matching behavior of sPDSCH scheduled around the corresponding CCEs. The first bit may indicate the rate-matching of sPDSCH around the overlap with CCE #0 to CCE #(floor($N_{CCE,k}/2$)−1) of the k-th sPDCCH RB set. The second bit may indicate the rate-matching of sPDSCH around the overlap with CCE #(floor($N_{CCE,k}/2$)) to CCE #$N_{CCE,k}$−1 of the k-th sPDCCH RB set. For example, in a case that b1=1, processor 412 may determine that the first half CCEs of RB set 1 are reused for sPDSCH. Processor 412 may receive downlink data in the first half CCEs of RB set 1. In a case that b2=0, processor 412 may determine that the second half CCEs of RB set 1 is configured for sPDCCH. Processor 412 may monitor and decode sPDCCH in the second half CCEs of RB set 1.

In some implementations, 2-bit indication for the second RB set may be applicable in case of 2 sPDCCH RB sets are configured for monitoring. Specifically, processor 412 may be configured to receive the dynamical signaling with 2 bits in DCI. The 2 bits may be represented by b1b2 carried in DCI. The first bit b1 may be used to indicate a first group of CCEs of the second RB set. The second bit b2 may be used to indicate a second group of CCES of the second RB set. Similarly, the first bit may indicate the rate-matching of sPDSCH around the overlap with CCE #0 to CCE #(floor ($N_{CCE,k}/2$)−1) of the k-th sPDCCH RB set. The second bit may indicate the rate-matching of sPDSCH around the overlap with CCE #(floor($N_{CCE,k}/2$)) to CCE #$N_{CCE,k}$−1 of the k-th sPDCCH RB set. For example, in a case that b1=1, processor 412 may determine that the first half CCEs of RB set 2 are reused for sPDSCH. Processor 412 may receive downlink data in the first half CCEs of RB set 2. In a case that b2=0, processor 412 may determine that the second half CCEs of RB set 2 is configured for sPDCCH. Processor 412 may monitor and decode sPDCCH in the second half CCEs of RB set 2.

In some implementations, indication options may be configured by higher layer signaling (e.g., radio resource control (RRC) signaling) from network apparatus 420. Processor 422 may include an indication for indicating the reuse indication configuration in a RRC message. Processor 412 may be configured to apply the reuse indication configuration according to the RRC message. For example, a configuration denoted as state {1, 1} may be used for indicating communication apparatus 410 to apply the 1-bit indication for each of 2 configured RB sets. A configuration denoted as state {2, 0} may be used for indicating communication apparatus 410 to apply the 2-bit indication for the first RB set of 1 or 2 configured RB sets. A configuration denoted as state {0, 2} may be used for indicating communication apparatus 410 to apply the 2-bit indication for the second RB set of 2 configured RB sets.

In some implementations, the L1 indication only applies to one of the 2 configured RB sets. For the RB set associated with state "0", the RRC configured rate-matching modes may be applied for the CCEs of the RB set without L1 indication. Processor 412 may be further configured to operate in one of the following four modes of sPDCCH rate-matching operation. In a Mode 1, processor 412 may be configured to rate-match only around the sDCI scheduling the sPDSCH (if transmitted in the sPDCCH RB-set). Otherwise, no rate-matching is performed for the RB set. In a Mode 2, processor 412 may be configured to rate-match around the whole sPDCCH RB set. In a Mode 3, processor 412 may be configured to rate-match around the whole sPDCCH RB set if sDCI scheduling the sPDSCH is found in the RB-set. Otherwise, no rate-matching is performed for the RB set. In a Mode 4, processor 412 may be configured to rate-match around the whole sPDCCH RB set if sDCI scheduling the sPDSCH is not found in the RB-set. Otherwise, the UE may rate-match only around the sDCI scheduling the sPDSCH (if transmitted in the sPDCCH RB-set).

Illustrative Processes

Figure 5:
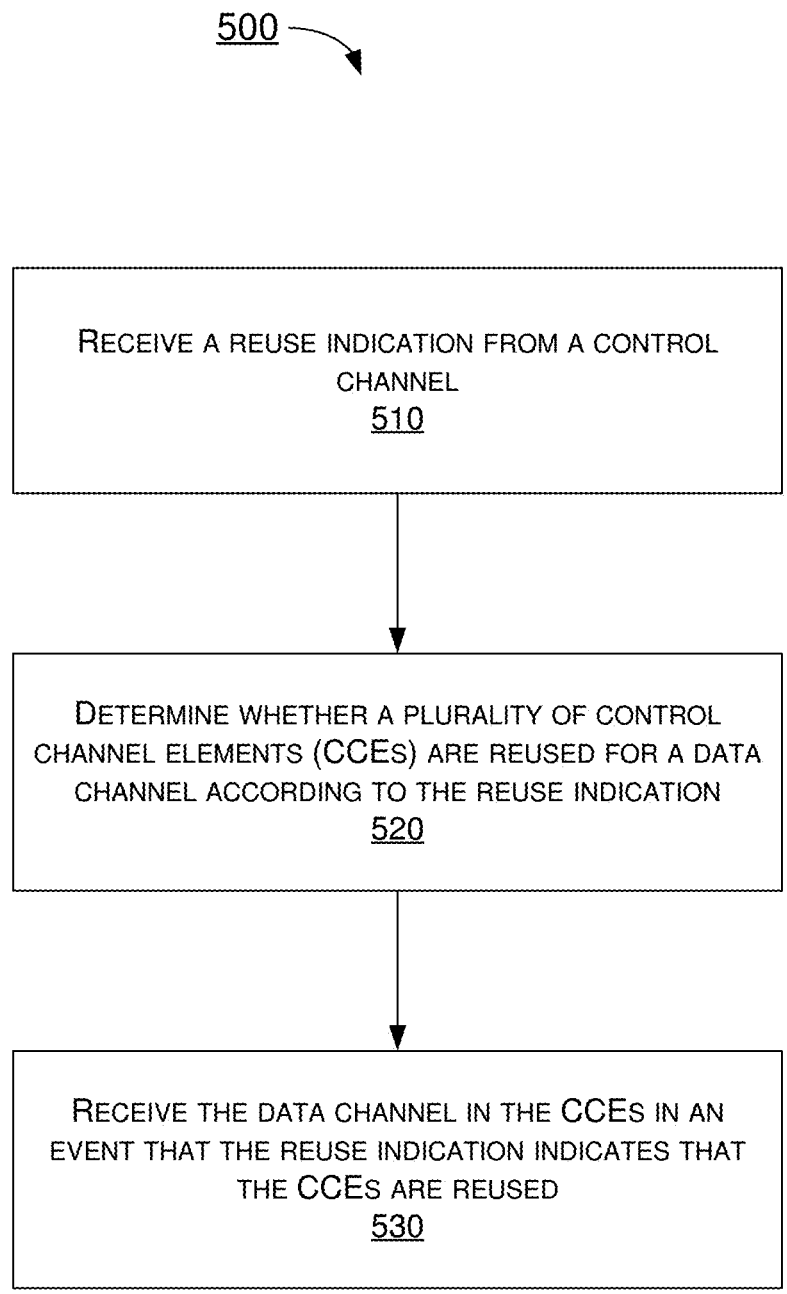
FIG. 5 is a flowchart of an example process in accordance with an implementation of the present disclosure.

FIG. 5 illustrates an example process 500 in accordance with an implementation of the present disclosure. Process 500 may be an example implementation of scenarios 100, 200 and 300, whether partially or completely, with respect to multiplexing of sPDCCH and data in accordance with the present disclosure. Process 500 may represent an aspect of implementation of features of communication apparatus 410. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve communication apparatus 410 receiving a reuse indication from a control channel. Process 500 may proceed from 510 to 520.

At 520, process 500 may involve communication apparatus 410 determining whether a plurality of control channel elements (CCEs) are reused for a data channel according to the reuse indication. Process 500 may proceed from 520 to 530.

At 520, process 500 may involve communication apparatus 410 receiving the data channel in the CCEs in an event that the reuse indication indicates that the CCEs are reused.

In some implementations, the reuse indication may comprise a first bit for indicating whether a first group of the CCEs is reused for the data channel and a second bit for indicating whether a second group of the CCEs is reused for the data channel. A bit value of 1 may indicate that the data channel is rate-matched around the corresponding group of CCEs.

In some implementations, each of the first group of the CCEs and the second group of the CCEs may be a function of a size of control channel resources defined in a resource block (RB) set. The first group of the CCEs may be a first half CCEs of the RB set, and wherein the second group of the CCEs may be a second half CCEs of the RB set.

In some implementations, the control channel may be a short physical downlink control channel (sPDCCH). The data channel may be a short physical downlink shared channel (sPDSCH). The reuse indication is comprised in downlink control information (DCI).

In some implementations, process 500 may further involve communication apparatus 410 receiving a radio resource control (RRC) message for indicating that the reuse indication is a 2-bit indication for one RB set and applying the reuse indication according to the RRC message.

In some implementations, the 2-bit indication may be configured for a first RB set of two configured sPDCCH RB sets. In some implementations, the 2-bit indication may be configured for a second RB set of two configured sPDCCH RB sets.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, radio resource control (RRC) signaling indicating a reuse indication configuration;
receiving, by the processor, a usage indication from a control channel;
determining, by the processor, whether a plurality of control channel elements (CCEs) in short physical downlink control channel (sPDCCH) search spaces are in use or not in use for a data channel according to the usage indication;
receiving, by the processor, the data channel; and
performing, by the processor, a short physical downlink shared channel (sPDSCH) rate-matching operation to rate-match around one or more of the CCEs not used for data channel according to the usage indication and a sPDCCH resource block (RB) set containing a downlink control information (DCI) that schedules the data channel,
wherein the DCI contains a plurality of bits a value of each indicating whether a corresponding resource or set of resources is used for the sPDSCH, and
wherein the performing of the sPDSCH rate-matching operation comprises applying indication of the plurality of bits to different CCEs within a given RB set according to the reuse indication configuration indicated in the RRC signaling.

2. The method of claim 1, wherein the usage indication comprises a first bit for indicating whether a first group of the CCEs is used for the data channel and a second bit for indicating whether a second group of the CCEs is used for the data channel.

3. The method of claim 2, wherein a bit value of 1 indicates that the data channel is rate-matched around the corresponding group of CCEs.

4. The method of claim 2, wherein each of the first group of the CCEs and the second group of the CCEs is a function of a size of control channel resources defined in a resource block (RB) set.

5. The method of claim 4, wherein the first group of the CCEs comprises a first half CCEs of the RB set, and wherein the second group of the CCEs comprises a second half CCEs of the RB set.

6. The method of claim 1, wherein the control channel comprises a short physical downlink control channel (sPDCCH), and wherein the data channel comprises a short physical downlink shared channel (sPDSCH).

7. The method of claim 1, wherein the usage indication is comprised in downlink control information (DCI).

8. The method of claim 1, wherein the plurality of bits comprise a 2-bit indication.

9. The method of claim 8, wherein the 2-bit indication is configured for a first RB set of two configured sPDCCH RB sets.

10. The method of claim 8, wherein the 2-bit indication is configured for a second RB set of two configured sPDCCH RB sets.

11. An apparatus, comprising:
a transceiver capable of wirelessly communicating with a plurality of nodes of a wireless network; and
a processor communicatively coupled to the transceiver, the processor capable of:
receiving, via the transceiver, radio resource control (RRC) signaling indicating a reuse indication configuration;
receiving, via the transceiver, a usage indication from a control channel;
determining whether a plurality of control channel elements (CCEs) in short physical downlink control channel (sPDCCH) search spaces are in use or not in use for a data channel according to the usage indication;
receiving, via the transceiver, the data channel; and
performing a short physical downlink shared channel (sPDSCH) rate-matching operation to rate-match around one or more of the CCEs not used for data channel according to the usage indication and a sPDCCH resource block (RB) set containing a downlink control information (DCI) that schedules the data channel,
wherein the DCI contains predefined bits a value of each indicating whether a corresponding resource or set of resources is used for the sPDSCH, and
wherein, in performing the sPDSCH rate-matching operation, the processor applies indication of the predefined bits to different CCEs within a given RB set according to the reuse indication configuration indicated in the RRC signaling.

12. The apparatus of claim 11, wherein the usage indication comprises a first bit for indicating whether a first group of the CCEs is used for the data channel and a second bit for indicating whether a second group of the CCEs is used for the data channel.

13. The apparatus of claim 12, wherein a bit value of 1 indicates that the data channel is rate-matched around the corresponding group of CCEs.

14. The apparatus of claim 12, wherein each of the first group of the CCEs and the second group of the CCEs is a function of a size of control channel resources defined in a resource block (RB) set.

15. The apparatus of claim 14, wherein the first group of the CCEs comprises a first half CCEs of the RB set, and wherein the second group of the CCEs comprises a second half CCEs of the RB set.

16. The apparatus of claim 11, wherein the control channel comprises a short physical downlink control channel (sPDCCH), and wherein the data channel comprises a short physical downlink shared channel (sPDSCH).

17. The apparatus of claim 11, wherein the usage indication is comprised in downlink control information (DCI).

18. The apparatus of claim 11, wherein the plurality of bits comprise a 2-bit indication.

19. The apparatus of claim 18, wherein the 2-bit indication is configured for a first RB set of two configured sPDCCH RB sets.

20. The apparatus of claim 18, wherein the 2-bit indication is configured for a second RB set of two configured sPDCCH RB sets.

* * * * *